United States Patent
Krnja et al.

(10) Patent No.: US 10,249,196 B2
(45) Date of Patent: Apr. 2, 2019

(54) FLOW CORRIDOR DETECTION AND DISPLAY SYSTEM

(71) Applicant: Ford Global Technologies, LLC, Dearborn, MI (US)

(72) Inventors: Filip Krnja, London (GB); Vincent Leslie Shaw, Gainsborough (GB); David Woodhouse, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/658,002

(22) Filed: Jul. 24, 2017

(65) Prior Publication Data
US 2018/0025647 A1  Jan. 25, 2018

(30) Foreign Application Priority Data
Jul. 25, 2016 (GB) .................... 1612828.2

(51) Int. Cl.
*G08G 1/16* (2006.01)
*B60R 16/00* (2006.01)
(Continued)

(52) U.S. Cl.
CPC ........... *G08G 1/167* (2013.01); *B60R 16/005* (2013.01); *B62D 15/029* (2013.01); *B62D 15/0295* (2013.01); *G08G 1/04* (2013.01); *G08G 1/052* (2013.01); *G08G 1/09626* (2013.01); *G08G 1/166* (2013.01)

(58) Field of Classification Search
CPC .. B62D 15/029; B62D 15/0295; G08G 1/167; G08G 1/104; G08G 1/052; G08G 1/09626; G08G 1/166; B60R 16/005

USPC .. 340/901, 903, 905, 425.5, 426.22, 426.23, 340/436, 438, 439
See application file for complete search history.

(56) References Cited

U.S. PATENT DOCUMENTS 8,378,850 B2    2/2013  Toledo et al.
2008/0077327 A1*  3/2008  Harris ................. B60R 9/04
                                            701/301
(Continued)

FOREIGN PATENT DOCUMENTS

DE    102009009472 A1    8/2010
DE    102015015023 A1    5/2016
(Continued)

OTHER PUBLICATIONS

UK Search Report dated Jan. 24, 2017.

*Primary Examiner* — Ojiako K Nwugo
(74) *Attorney, Agent, or Firm* — Frank MacKenzie; Brooks Kushman, P.C.

(57) ABSTRACT

A flow corridor detection system for use on a vehicle is provided. The system includes one or more sensors configured to measure available space in front of the vehicle; a data module include vehicle trajectory data that predicts trajectories of other vehicles, a memory defining vehicle dimension data, a dynamic memory having driver behavior and skill data, a processor configured to combine sensor measurements with data from the data module, memory and dynamic memory in order to detect a corridor through which the vehicle can proceed, and to quantify the risk level associated with the corridor. A display is configured to represent the location and risk level of the corridor to the driver of the vehicle.

19 Claims, 3 Drawing Sheets

(51) Int. Cl.
*B62D 15/02* (2006.01)
*G08G 1/04* (2006.01)
*G08G 1/052* (2006.01)
*G08G 1/0962* (2006.01)

(56) References Cited

U.S. PATENT DOCUMENTS

| | | | |
|---|---|---|---|
| 2008/0243389 A1 | 10/2008 | Inoue et al. | |
| 2008/0270519 A1* | 10/2008 | Ekdahl | G07C 5/008 709/203 |
| 2009/0265107 A1* | 10/2009 | Matsuno | G08G 1/165 701/301 |
| 2012/0083947 A1* | 4/2012 | Anderson | B60W 30/09 701/3 |
| 2012/0083960 A1* | 4/2012 | Zhu | G05D 1/0055 701/23 |
| 2014/0266655 A1* | 9/2014 | Palan | G06K 9/00805 340/435 |
| 2015/0266455 A1* | 9/2015 | Wilson | G09B 19/10 701/93 |
| 2015/0348416 A1* | 12/2015 | Fujita | G06K 9/00805 348/47 |
| 2015/0348418 A1 | 12/2015 | Pfeiffer et al. | |
| 2016/0039411 A1* | 2/2016 | Park | G01S 13/87 701/70 |
| 2017/0261990 A1* | 9/2017 | Lei | G05D 1/0214 |
| 2018/0061237 A1* | 3/2018 | Erickson | G08G 1/163 |
| 2018/0070213 A1* | 3/2018 | Ali | H04W 4/029 |
| 2018/0086336 A1* | 3/2018 | Jones | B60W 30/09 |
| 2018/0087907 A1* | 3/2018 | DeBitetto | G05D 1/0088 |
| 2018/0089538 A1* | 3/2018 | Graham | G06T 7/004 |

FOREIGN PATENT DOCUMENTS

| | | |
|---|---|---|
| DE | 102015121443 A1 | 7/2016 |
| EP | 2234085 A1 | 9/2010 |
| JP | 2007034988 A | 2/2007 |

* cited by examiner

FLOW CORRIDOR DETECTION AND DISPLAY SYSTEM

CROSS-REFERENCE TO RELATED APPLICATIONS

This application claims foreign priority benefits under 35 U.S.C. § 119(a)-(d) to GB 1612828.2 filed Jul. 25, 2016, which is hereby incorporated by reference in its entirety.

TECHNICAL FIELD

This disclosure relates to improvements in, or relating to, driving aids.

BACKGROUND

In dense, uncontrolled traffic situations, such as those in India, there may be considerable advantages gained by maneuvering a vehicle between adjacent vehicles to move through dense traffic. To do this effectively, it is necessary to fully appreciate the capabilities of the vehicle, and, also, to accurately predict the driving patterns of adjacent vehicles.

SUMMARY

According to the present disclosure there is provided a flow corridor detection system for use on a vehicle. The system includes one or more sensors configured to measure available space in front of the vehicle. The system also includes a data module defining vehicle trajectory data for predicting the trajectories of other vehicles. The system further includes a memory having vehicle dimension data, a dynamic memory including driver behavior and skill data, and a processor configured to combine sensor measurements with data from the data module, memory and dynamic memory in order to detect a corridor through which the vehicle can proceed, and to quantify the risk level associated with the corridor. The system may also include a display configured to represent the location and risk level of the corridor to a driver of the vehicle.

The sensors may be common to a collision warning and mitigation system provided on the vehicle. The sensors may scan the space in front of the vehicle. The processor may combine sensor measurements with data from the data module through trajectory mapping and object recognition. Alternatively, the sensors may be ultra-sonic parking sensors.

At least one of the sensors may measure the tilt angle of the vehicle. At least one of the sensors may measure the speed of the vehicle.

The progress of the vehicle through the corridor may be monitored by the sensors, and the sensor data may be stored in the dynamic memory as being indicative of driver behavior.

The display may represent the corridor as a series of nested gates showing the recommended trajectory of the vehicle. The risk level of the corridor may be indicated by the color of the gates. For example, a low risk or clear passage could be shown by a green loop or rectangle, a medium risk by an amber shape and an unusable corridor identified in red. In order to discourage the driver from using such a corridor, instead of a simple bounding box indicating the corridor through which the vehicle could pass, an unusable corridor can be identified by a red closed door. However, if the driver is red-green color blind, it may be preferable to alter the visual configuration of the nested shapes, for example, by changing the thickness of the bounding box, or gate so that a very fine box indicates no problem, a thicker box indicates that care is required and an closed door represents the absence of a safe corridor.

The color of the gates may change along a given flow corridor so that some parts may be low risk, and illustrated as green, which others may be amber or even red. This allows the driver to make a judgement as to whether to proceed onto a given flow corridor knowing that, on the basis of current traffic behavior, they will not be able to proceed beyond a given point. The driver may make the judgement that they would prefer to remain in their current position, rather than having to come to a stop in the location indicated by the red gate indicating the end of the safe corridor. As the driver continues to use the system, these judgements can be captured by the dynamic memory that holds information about the driver's behavior and skills as this is used to identify safe corridors on future occasions.

The system can be configured according to the preferences of the driver. In particular, the number of gates shown can vary depending on the driver's preference. It may be that the driver requires only a minimal number of gates, to inform key pinch points and direction of movement where more than one option is available. Conversely, the driver may prefer an increased granularity such that various intermediate conditions are illustrated, thus providing a much more accurate illustration of the intended driving path.

The gates may be substantially rectangular. The gates are in shaped to match the overall envelope of the vehicle, and are, therefore, typically, approximately rectangular. The corners of the rectangles may be curved.

The rectangle may be tilted to represent a two-wheeled vehicle leaning. The extent of the lean will be determined by the speed of the vehicle. This is particularly important for a motor bike not coming into collision with wing mirrors of other vehicles when passing close, and comparatively fast. For a motor bike system, at least one of the sensors measures the leaning angle of the vehicle whilst another sensor measures the speed of the vehicle. The correlation between these two factors will be taken into account by the processor when calculating the flow corridor, and advising the level of risk associated with it.

In addition to the series of nested gates, further information may be included in terms of a recommendation such as text reading "slow." This would be particularly applicable to a motor bike application where the shape of the gate may change depending on the speed of the vehicle because if the vehicle is turning at speed, the driver will lean. It may, therefore, be that there is a viable corridor if the vehicle is turning at 20 mph, but if the speed exceeds 25 mph, then the angle of rotation of the motor bike and driver would be such that the driver's shoulder could be in collision with a car wing mirror as the motor bike rounds the corner. Under these circumstances, and other similar circumstances, the simple nested gates may be augmented by simple text commands such as "slow."

In some embodiments, the text "stop" could be applied across a red gate to clarify that there is no safe corridor through which the vehicle can travel.

The system may be configured to review and update the corridor in real time.

The system may remain dormant until positively initiated by the driver. This configuration may be particularly useful on fleet vehicles where there is an experienced driver, but they have to use a variety of different vehicles. The driver may not wish to use the system at all times, but during an initial phase of familiarization with the vehicle, the driver may wish to check their judgement of the flow corridors available to them. In this case, the driver may initiate the system by flicking a switch, get a quick check of their current situation, and a validation or contradiction of their judgement as to the risk of the corridor ahead of them.

The system may initiated by a switch, which may be positioned on the steering wheel or handle bars of the vehicle.

Alternatively, or additionally, the system may be configured to become fully active automatically when the sensors detect that the proximity to neighboring vehicles has fallen below a predetermined threshold.

The display may be configured such that the driver views the representation of the corridor overlaid onto the space in front of the vehicle, for example on a helmet visor or on a head up display. The provision of the representation of the corridor in such a manner that the driver observes it overlaying the real traffic situation is advantageous as it prevents the driver having to correlate two different information sources in real time. If the vehicle is a motor bike then the display may be provided on the helmet visor. Conversely, if the vehicle is a car, van or truck, then the display may be provided in the form of a head up display. A further opinion within a car, van or truck would be to provide the corridor indication overlaid on the live traffic situation on a screen within the vehicle. The screen may be used for multimedia when the system is not deployed.

The system may be further configured to interface with route guidance technology in order to obtain data pertaining to the intended route to be taken by the vehicle.

The provision of routing information can inform the system when approaching an intersection, junction or roundabout because, whilst it may be possible for the vehicle to fit through a gap and continue to flow along a corridor through the traffic, if it leaves the vehicle in the wrong lane so that it cannot continue along the course to its intended destination, then this would be sub-optimal. Also, routing information can help to disambiguate the data in the sense that where two corridors exist, one to the left and one to the right, yet the driver intends to turn to the right at this, or a shortly subsequent intersection or junction, then the system will recommend the corridor to the right as this will best align with the intended routing of the vehicle.

The dynamic memory may be configured to hold more than one driver profile. The provision of more than one driver profile is helpful in terms of differentiating between different driving styles and experience. For a motor bike system, information would also be included about the size of the driver as the overall envelope occupied by the vehicle will change depending on the identity of the driver.

The disclosure will now be further and more particularly described, by way of example only, and with reference to the accompanying drawings, in which:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
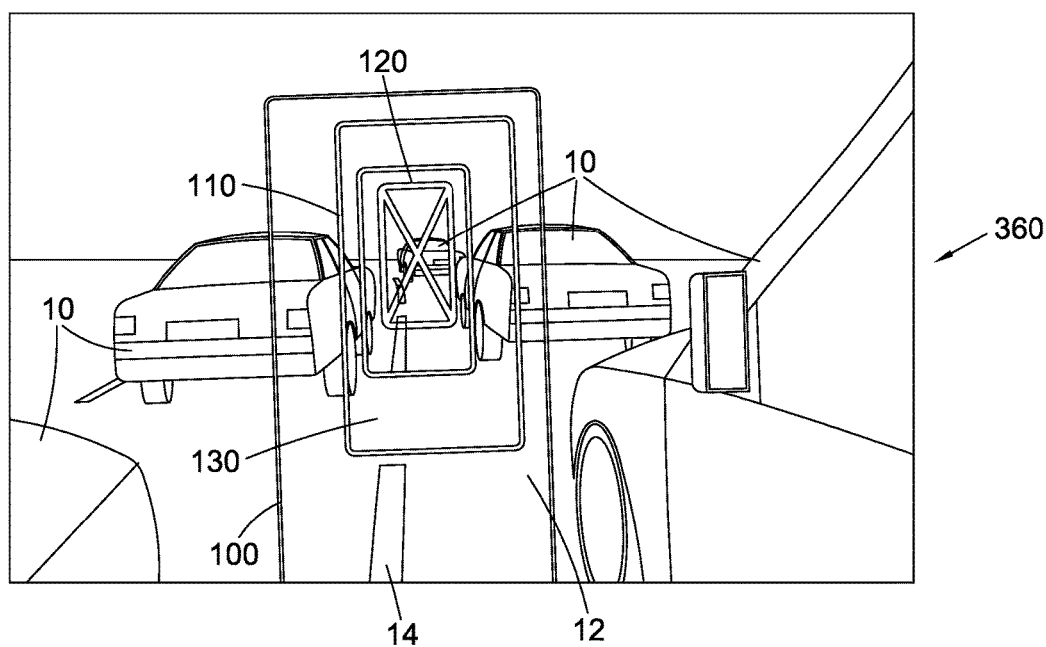
FIG. 1 shows an example of the display of a system according to the present disclosure.

FIG. 1 shows a snap shot from a display 360 of the system of the present disclosure. FIG. 1 illustrates what the driver sees when the display 360 is viewed. Through the transparent elements of the display, the driver sees adjacent vehicles 10 being driven along a road 12. The road 12 has two lanes of vehicles 10 separated by a dashed line 14. These features are all apparent to the driver as they are viewed through the transparent elements of the display. These transparent elements can form part of a helmet visor for a motorcyclist, an intelligent windscreen or other head up display in a car, van or truck.

The output of the system takes the form of a series of nested gates 100, 110, 120, which are superposed on the road ahead from the driver's perspective. In this example, a flow corridor 130 is formed between rows of adjacent vehicles 10. However, as a result of the positioning of the adjacent vehicles 10, the width of the corridor reduces. The corridor is therefore marked initially by a fine dashed line gate 100 that indicates the driver can safely advance into this space. However, beyond the first gate, the available corridor narrows, so the second gate 110 is bounded by a thicker box indicating that the driver should only proceed to this point with caution and, potentially, at a reduced speed. The final gate 120 in this example is bounded by a very thick line and closed through by two cross hairs to indicate that the safe corridor has come to an end, and there is not sufficient space for the driver to proceed further.

Although FIG. 1 shows that the different gates 100, 110 and 120 are illustrated by different thickness of bounding box, in a color environment, they would have the same thickness, but different colors in-line with commonly understood "traffic light" system of green for "go," or "safe to proceed" for gate 100; amber for gate 110 because caution should be exercised and speed may need to be reduced, and red for gate 120 to indicate danger, stop, no entry.

Figure 2:
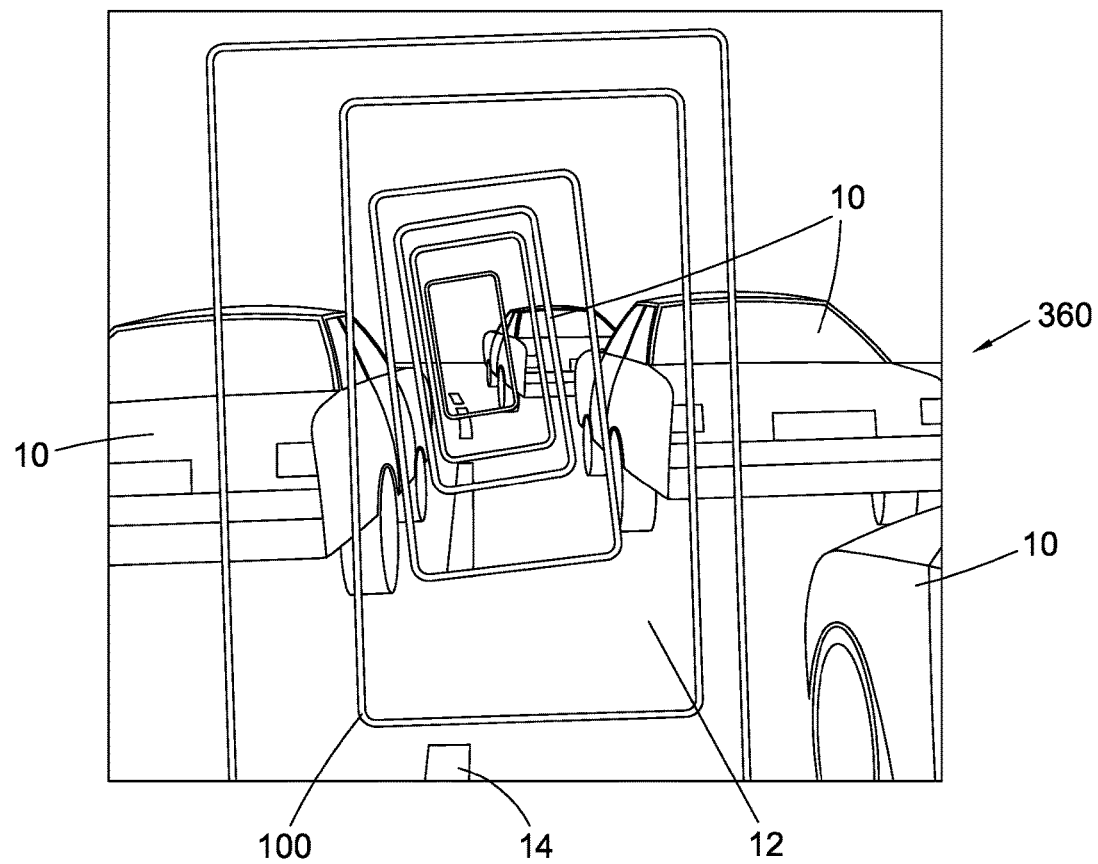
FIG. 2 shows a further example of the display of the system according to the present disclosure.

FIG. 2 shows a snap shot from another display 360 for use in a motorbike application. In this example, the rectangular gate illustrating the intended path of the vehicle is capable of tilting to indicate that the vehicle is leaning into a corner. As illustrated in FIG. 2, there is a section of road 12 populated with two rows of vehicles 10. The snap shot display image shows a series of nested, substantially rectangular gates 100, each bounded by a thin bounding box indicating that it is safe to proceed around this corner between the two rows of adjacent vehicles 10. In order to do so, whilst continuing in the intended direction at the current speed, the driver will need to lean. This firstly ensures that the driver can navigate the corner safely, but also indicates that the lean has been accounted for in calculating the space, and, therefore, the driver should lean in order to ensure that there is no collision with wing mirrors on the adjacent vehicles 10.

Figure 3:
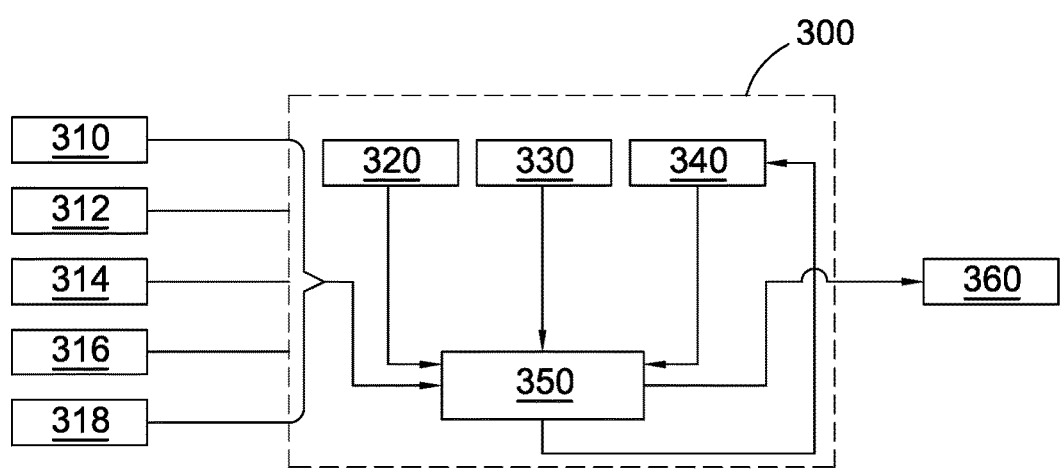
FIG. 3 shows schematically the constituent parts of the system of the present disclosure.

FIG. 3 shows, schematically, the constituent parts of the system 300. The system includes a plurality of sensors, which include a speed sensor 310, a tilt sensor 312, a width detection sensor 314 that is configured to use high resolution scanning, a camera 316 configured to capture image data and a GPS sensor 318 that confirms the location of the vehicle;

and a Lidar sensor configured to capture a 3D representation of the environment. These sensors are not necessarily dedicated to the system, but may be provided as part of other vehicle systems, such as parking assist systems, satellite navigation systems and collision avoidance or mitigation systems. The data captured by these sensors is included within more than one vehicle system.

Within the system 300, there is provided a data module 320 defining vehicle trajectory data that predicts the trajectories of other vehicles, a memory 330 having vehicle dimension data, and a dynamic memory 340 including driver behavior and skill data. The data module 320 defines a considerable amount of trend data indicating how different traffic situations will proceed, including how different vehicles are likely to react under different circumstances and the likely trajectory of each vehicle. The memory 330 holding the vehicle dimension data remains static for a car, van or truck and only forms part of the data for a motorbike. The dynamic memory 340 is a repository for data relating to how a driver has handled different situations. The dynamic memory 340 may be split into a number of different profiles, each for a different driver. This allows the system to be sensitive to different driving profiles of different drivers, including their skill and approach to risk taking. Furthermore, for a motor bike application, the dynamic memory 340 includes details of the height and weight of the different drivers as this will alter the overall envelope of the vehicle, and affect the handling of the vehicle.

The data module 320, memory 330 and dynamic memory 340, and data received from all of the sensors 310, 312, 314, 316, 318 are fed forward to a processor 350. The processor 350 calculates the current size of a safe corridor 130 existing in front of the vehicle, and predicts how this corridor 130 will develop over time. The processor 350 also calculates the risk associated with proceeding into the corridor 130 as a result of its size, and how dynamic the situation is, i.e. how rapidly the vehicles are moving and the level of certainty of the behavior of the adjacent vehicles. The size and risk level of the corridor 130 are then graphically represented on a display 360.

The display 360 combines a graphical representation of the safe corridor 130 with the real-road situation, either by projecting the graphical representation onto an interface between the driver and the road, such as the driver's retina, the windscreen or the driver's helmet visor, or by providing a composite data stream including real time video data, and the graphical representation of the safe corridor 130.

The processor 350 is also configured to feedback data from the sensors showing how the driver dealt with the road conditions to the dynamic memory 340 in order to further inform future situations.

It will further be appreciated by those skilled in the art that although the disclosure has been described by way of example with reference to several embodiments it is not limited to the disclosed embodiments and that alternative embodiments could be constructed without departing from the scope of the disclosure as defined in the appended claims.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle corridor detection system comprising:
   sensors configured to measure a space in front of a vehicle;
   a module having trajectory data predictive of vehicle trajectories via a memory defining vehicle dimension data, a dynamic memory including behavior and skill data, and a processor to combine the space with the trajectory data to detect a corridor, and quantify a risk level associated with the corridor, wherein vehicle progress through the corridor is monitored by the sensors and stored in the dynamic memory indicative of driver behavior; and a display to represent the corridor and risk level.

2. The system according to claim 1, wherein the sensors are ultra-sonic parking sensors.

3. The system according to claim 1, wherein the processor combines with the space and trajectory data via trajectory mapping and object recognition.

4. The system according to claim 1, wherein at least one of the sensors is configured to measure a tilt angle of the vehicle.

5. The system according to claim 1, wherein at least one of the sensors measures speed of the vehicle.

6. The system according to claim 1, wherein the display represents the corridor as a series of nested gates showing a recommended vehicle trajectory.

7. The system according to claim 6, wherein the risk level is indicated by a color of the gates.

8. The system according to claim 1, wherein and the corridor is updated in real time.

9. The system according to claim 1 further comprising a switch to positively initiate the module.

10. The system according to claim 9, wherein the switch is positioned on a steering wheel or handle bars of the vehicle.

11. The system according to claim 1, wherein the module is further configured to, in response to the sensors detecting that a proximity to neighboring vehicles has fallen below a predetermined threshold, detect the corridor automatically.

12. The system according to claim 1, wherein the display is configured to represent the corridor overlaid onto the space in front of the vehicle.

13. The system according to claim 1, wherein the module is further configured to interface with a route guidance system to obtain data pertaining to an intended route taken by the vehicle.

14. The system according to claim 1, wherein the dynamic memory is configured to hold more than one driver profile.

15. A vehicle driving aid system comprising:
   sensors configured to measure a space in front of a vehicle;
   a module having trajectory data predictive of vehicle trajectories via a memory defining vehicle dimension data, a dynamic memory including behavior and skill data, and a processor to combine the space with the trajectory data to detect a corridor, and quantify a risk level associated with the corridor, wherein the module is configured to, in response to the sensors detecting that a proximity to neighboring vehicles has fallen below a predetermined threshold, automatically detect the corridor and quantify the risk level; and wherein vehicle progress through the corridor is monitored by the sensors and stored in the dynamic memory as being indicative of driver behavior; and
   a display to represent the corridor and risk level as a series of nested gates showing a recommended vehicle trajectory that is overlaid onto data indicative of the space.

16. The system as claimed in claim 15, wherein the dynamic memory is configured to hold more than one driver profile.

17. The system according to claim 15 further comprising a switch to positively initiate the module.

18. The system according to claim 15, wherein the gates are substantially rectangular.

19. The system according to claim 18, wherein the gates are tilted to represent a two-wheeled vehicle leaning.

* * * * *